United States Patent
Joshi et al.

(10) Patent No.: US 12,045,662 B2
(45) Date of Patent: Jul. 23, 2024

(54) DATA RE-ENCRYPTION FOR SOFTWARE APPLICATIONS

(71) Applicant: SAP SE, Walldorf (DE)

(72) Inventors: Himanshu Joshi, Bangalore (IN); Hiren Shah, Bangalore (IN)

(73) Assignee: SAP SE, Walldorf (DE)

( * ) Notice: Subject to any disclaimer, the term of this patent is extended or adjusted under 35 U.S.C. 154(b) by 409 days.

(21) Appl. No.: 17/394,109

(22) Filed: Aug. 4, 2021

(65) Prior Publication Data
US 2023/0045103 A1 Feb. 9, 2023

(51) Int. Cl.
G06F 21/00 (2013.01)
G06F 9/50 (2006.01)
G06F 16/22 (2019.01)
G06F 21/78 (2013.01)

(52) U.S. Cl.
CPC .............. G06F 9/505 (2013.01); G06F 16/22 (2019.01); G06F 21/78 (2013.01)

(58) Field of Classification Search
CPC .......... G06F 9/505; G06F 16/22; G06F 21/78; G06F 9/5066; G06F 21/602
See application file for complete search history.

(56) References Cited

U.S. PATENT DOCUMENTS

| | | | |
|---|---|---|---|
| 11,487,573 B2 * | 11/2022 | Parikh | G06F 9/44526 |
| 2016/0294549 A1 * | 10/2016 | Qian | H04L 9/0822 |
| 2019/0147170 A1 * | 5/2019 | Keselman | G06F 21/602 |
| | | | 713/189 |
| 2022/0284004 A1 * | 9/2022 | Okutubo | G06F 16/28 |

* cited by examiner

*Primary Examiner* — Ghazal B Shehni
(74) *Attorney, Agent, or Firm* — Fountainhead Law Group, PC (57) ABSTRACT

Some embodiments provide a non-transitory machine-readable medium that stores a program. The program receives a request to execute a task for re-encrypting a set of data associated with an application that has been encrypted with a first encryption key. The task is for re-encrypting the set of data using a second encryption key. The program further determines an amount of work to complete the task. The program also divides the task into a set of subtasks based on the amount of work. The program further assigns each subtask in the set of subtasks to a node in a plurality of nodes for execution of the subtask. The plurality of nodes are configured to implement the application.

20 Claims, 6 Drawing Sheets

DATA RE-ENCRYPTION FOR SOFTWARE APPLICATIONS

BACKGROUND

Today, computing systems manage an increasing amount of data. Frequently, the data that computing systems manage include a wide range of sensitive data (e.g., addresses, social security numbers, bank account numbers, credit card numbers, passwords, etc.). Many solutions exist for protecting such sensitive data. For example, sensitive data can be anonymized (e.g., removing identifying information from sensitive data). As another example, computing systems may employ data pseudonymization techniques where identifying information in sensitive data are replaced with pseudonyms (e.g., artificial identifiers). In some instances, encryption methods are used to encode sensitive data so that it cannot be deciphered by unauthorized parties.

SUMMARY

In some embodiments, a non-transitory machine-readable medium stores a program executable by at least one processing unit of a device. The program receives a request to execute a task for re-encrypting a set of data associated with an application that has been encrypted with a first encryption key. The task is for re-encrypting the set of data using a second encryption key. The program further determines an amount of work to complete the task. The program also divides the task into a set of subtasks based on the amount of work. The program further assigns each subtask in the set of subtasks to a node in a plurality of nodes for execution of the subtask. The plurality of nodes are configured to implement the application.

In some embodiments, the device may be a particular node in the plurality of nodes. The program may further execute the subtask assigned to the particular node. The subtask may specify a subset of the set of data. Executing the subtask may include retrieving the subset of the set of data from a storage configured to store encrypted data; using the first encryption key to decrypt the subset of the set of data; using the second encryption key to encrypt the subset of the set of data, and storing the encrypted subset of the set of data in the storage. The program may further retrieve configuration data associated with the application. The configuration data may include metadata specifying data in the set of data that is encrypted. Determining the amount of work may be based on the metadata.

In some embodiments, dividing the task into the set of subtasks may include dividing the task into a set of batches of work. The set of data may be stored in a database. Each batch of work in the set of batches of work may specify a set of rows in the database storing a subset of the set of data. The set of data may be stored in a file system that includes a plurality of files. Each batch of work in the set of batches of work may specify a set of files in the plurality of files storing a subset of the set of data.

In some embodiments, a method executable by a device receives a request to execute a task for re-encrypting a set of data associated with an application that has been encrypted with a first encryption key. The task is for re-encrypting the set of data using a second encryption key. The method further determines an amount of work to complete the task. The method also divides the task into a set of subtasks based on the amount of work. The method further assigns each subtask in the set of subtasks to a node in a plurality of nodes for execution of the subtask. The plurality of nodes are configured to implement the application.

In some embodiments, the device may be a particular node in the plurality of nodes. The program may further execute the subtask assigned to the particular node. The subtask may specify a subset of the set of data. Executing the subtask may include retrieving the subset of the set of data from a storage configured to store encrypted data; using the first encryption key to decrypt the subset of the set of data; using the second encryption key to encrypt the subset of the set of data, and storing the encrypted subset of the set of data in the storage. The method may further retrieve configuration data associated with the application. The configuration data may include metadata specifying data in the set of data that is encrypted. Determining the amount of work is based on the metadata.

In some embodiments, dividing the task into the set of subtasks may include dividing the task into a set of batches of work. The set of data may be stored in a database. Each batch of work in the set of batches of work may specify a set of rows in the database storing a subset of the set of data. The set of data may be stored in a file system that includes a plurality of files. Each batch of work in the set of batches of work may specify a set of files in the plurality of files storing a subset of the set of data.

In some embodiments, a system includes a set of processing units and a non-transitory machine-readable medium that stores instructions. The instructions cause at least one processing unit to receive a request to execute a task for re-encrypting a set of data associated with an application that has been encrypted with a first encryption key. The task is for re-encrypting the set of data using a second encryption key. The instructions further cause the at least one processing unit to determine an amount of work to complete the task. The instructions also cause the at least one processing unit to divide the task into a set of subtasks based on the amount of work. The instructions further cause the at least one processing unit to assign each subtask in the set of subtasks to a node in a plurality of nodes for execution of the subtask. The plurality of nodes are configured to implement the application.

In some embodiments, the system may be a particular node in the plurality of nodes. The instructions may further cause the at least one processing unit to execute the subtask assigned to the particular node. The subtask may specify a subset of the set of data. Executing the subtask may include retrieving the subset of the set of data from a storage configured to store encrypted data; using the first encryption key to decrypt the subset of the set of data; using the second encryption key to encrypt the subset of the set of data, and storing the encrypted subset of the set of data in the storage. The instructions may further cause the at least one processing unit to retrieve configuration data associated with the application. The configuration data may include metadata specifying data in the set of data that is encrypted. Determining the amount of work is based on the metadata.

In some embodiments, dividing the task into the set of subtasks may include dividing the task into a set of batches of work. The set of data may be stored in a database. Each batch of work in the set of batches of work may specify a set of rows in the database storing a subset of the set of data.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for re-encrypting data for software applications. In some embodiments, a system includes several nodes (e.g., a computer cluster) that are configured to implement a software application. Some of the data that the software application uses are stored in an encrypted format. This data is encrypted with an encryption key. The system may receive a request to execute a task to re-encrypt its encrypted data (e.g., a security breach is detected that necessitates re-encryption of the data) with a new encryption key. In response to the request, a lead node that was determined by the system divides the task into a set of subtasks. Then, the lead node assigns subtasks to the nodes for the nodes. Each of the nodes executes its respective subtask for re-encrypting a portion of the encrypted data with the new encryption key. During execution of the subtasks, each of the nodes can record the state of executing its subtask.

The techniques described in the present application provide a number of benefits and advantages over conventional methods for re-encrypting data. For example, dividing up the re-encryption task into subtasks and assigning them to different nodes allows the task to be completed quicker. Conventional approaches may employ a single computing device to perform the re-encryption of data.

Figure 1:
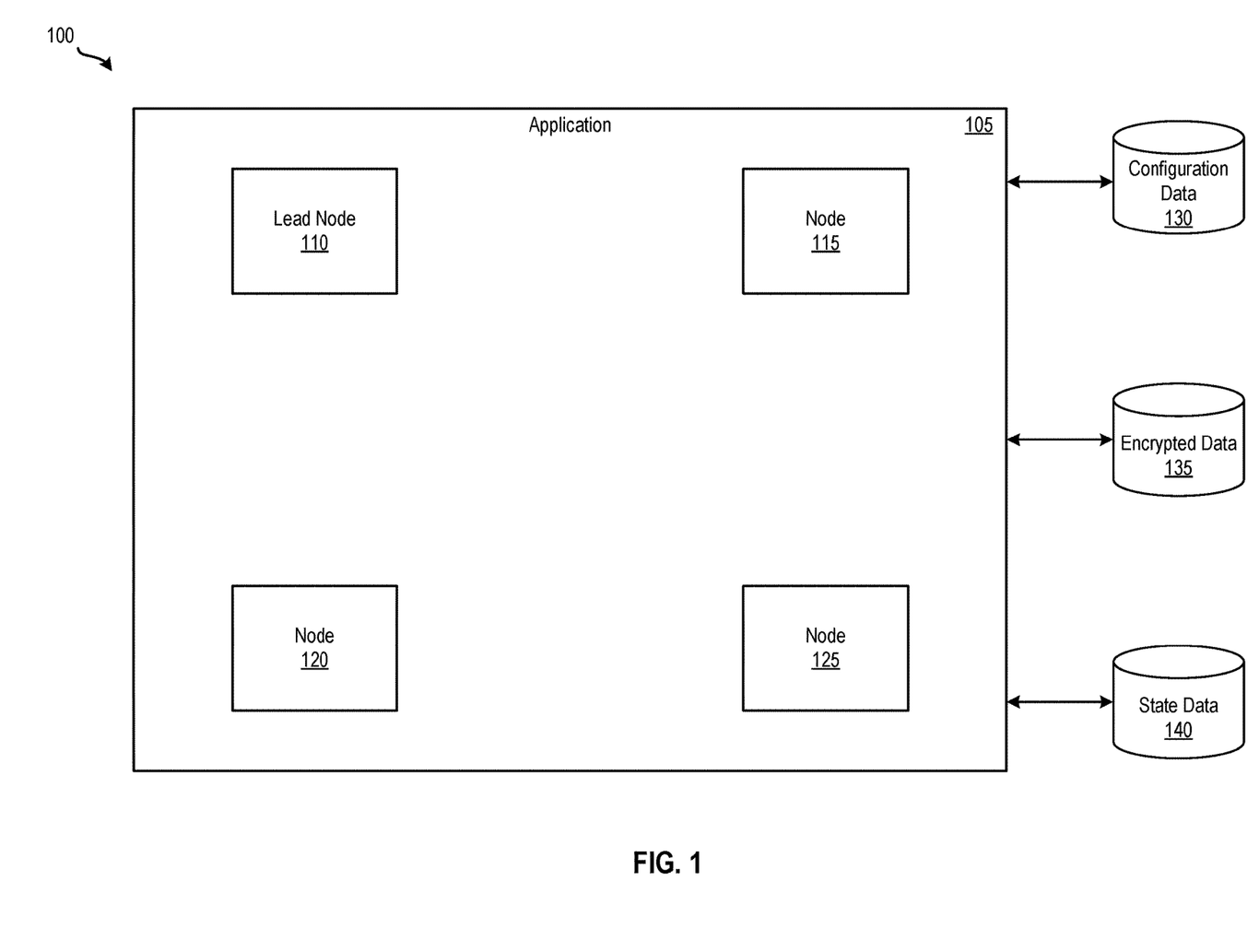
FIG. 1 illustrates a system for re-encrypting data according to some embodiments.

FIG. 1 illustrates a system 100 for re-encrypting data according to some embodiments. As shown, system 100 includes application 105 and storages 130-140. Configuration data storage 130 is configured to store configuration data associated with application 105. Examples of configuration data include metadata specifying data that is encrypted, a lead node, conditions for performing re-encryption, etc. Encrypted data storage 135 stores encrypted data associated with application 105 (e.g., encrypted data used by application 105) as well as non-encrypted data associated with application 105. State data storage 140 is configured to store state data associated with re-encryption tasks. In some embodiments, storages 130-140 are implemented in a single physical storage while, in other embodiments, storages 130-140 may be implemented across several physical storages. While FIG. 1 shows storages 130-140 as external to nodes 110-125, one of ordinary skill in the art will appreciate that configuration data storage 130, encrypted data storage 135, and/or state data storage 140 may be part of one or more of the nodes 110-125 in some embodiments.

In this example, application 105 is a software application implemented by nodes 110-125. Each of the nodes 110-125 may be a separate computing device or computing system. In some embodiments, nodes 110-125 are collectively referred to as a computing cluster. In some such embodiments, each of the nodes 110-125 has an instance of application 105 operating on it. When a request manager (not shown) receives a request to access application 105 (e.g., from a client device), the request manager selects one of the nodes 110-125 to handle the request. With this mechanism, application 105 can service requests from multiple clients at a time. While implementing application 105, each of the nodes 110-125 may use data that is stored in encrypted data storage 135 in an encrypted format. For instance, to access data that is stored in an encrypted format, a particular node retrieves the data from encrypted data storage 135 and decrypts it (e.g., using the encryption key that was used to encrypt it, using a decryption key, etc.). To store data that is configured to be stored in an encrypted format, a particular node can encrypt it using an encryption key and then store the encrypted data in encrypted data storage 135.

In some cases, the request handler can receive a new encryption key and a request to execute a task for re-encrypting data associated with application 105 using the new encryption key. The request handler forwards the request to lead node 110. In some embodiments, a lead node is determined based on configuration data stored in configuration data storage 130. Each of the nodes 110-125 checks configuration data storage 130 to see if the node is specified as the lead node. In this example, the configuration data would specify node 110 as the lead node. In other embodiments, a lead node may be randomly selected. Each instance of application 105 executes the same algorithm for randomly selecting one of the nodes 110-125 as being the lead node. In this manner, each of the nodes 110-125 selects the same node to be the lead node. For this example, each of the nodes 110-125 would randomly select node 110 to be the lead node.

When lead node 110 receives the request and the new encryption key, lead node 110 divides the task into a set of subtasks and assigns each of the subtasks to one of the nodes 110-125. In some embodiments, lead node 110 divides a task into subtasks by determining an amount of work to complete the task, determining nodes to perform the re-encryption task, and dividing the task into subtasks based on the determined amount of work and the determined nodes. For instance, lead node 100 can determine an amount of work to complete the task by accessing metadata stored in configuration data storage 130 that specifies which data in encrypted data storage 135 is stored in an encrypted format. Based on the metadata, lead node 110 can determine an amount of data that is to be re-encrypted. Lead node 110 may divide the task into subtasks based on the amount of data that is to be re-encrypted. For example, if lead node 110 determines that 4 gigabytes (GB) of is stored in encrypted data storage 135 in an encrypted format, and thus, 4 GBs of data is to be re-encrypted, and determines that nodes 110-125 are to perform the re-encryption task, lead node 110 may divide the task of re-encrypting 4 GBs of data into four subtasks of re-encrypting 1 GBs. Lead node 110 can determine nodes for performing the re-encrypting by selecting nodes from a group of candidate nodes based on a set of factors. The group of candidate nodes and the set of factors can be stored as configuration data in configuration data storage 130. Examples of factors include amount(s) of free resources available on a node (e.g., processor utilization, memory utilization, storage utilization, bandwidth utilization, etc.).

In this example, nodes 110-125 are included in the group of candidate nodes. In addition, lead node 110 determines that each of the nodes 110-125 have sufficient amounts of free resources available. Therefore, lead node 110 selects nodes 110-125 as nodes for performing the re-encryption task. In some embodiments, in addition to, or instead of, nodes 110-125, nodes dedicated for re-encryption operations (not shown) that are not used to implement application 105 may be included in the group of candidate nodes.

In some embodiments, subtasks are batches of work for completing the re-encryption task. For example, if the data stored in an encrypted format in encrypted data storage 135 is stored in a table of a database, each subtask (e.g., a batch of work) may specify a set of rows in the table to re-encrypt. As another example, if the data stored in an encrypted format in encrypted data storage 135 is stored as files in a file system, each subtask (e.g., a batch of work) can specify a set of files in the file system to re-encrypt. Once lead node 110 determines the nodes for performing the re-encryption task and divides the encryption task into a set of subtasks, lead node 110 assigns each subtask to one of the determined nodes. Then, lead node 110 sends each subtask to the node in the plurality of nodes to which the subtask is assigned.

After a determined node receives a subtask from lead node 110, the determined node executes the subtask. While a node executes a subtask, the node records the state of the execution of the subtask in state data storage 140. For instance, if the subtask specifies a set of rows in a table of database, the node can record in state data storage 140 that a particular row has been re-encrypted once the node finishes re-encrypting the particular row. As another example, if the subtask specifies a set of files in a file system, the node may record in state data storage 140 that a particular file has been re-encrypted once the node finishes re-encrypting the particular file. To re-encrypt a piece of data, a node retrieves the piece of data from encrypted data storage 135 and uses the current encryption key to decrypt the piece of data. Next, the node uses the new encryption key to encrypt the decrypted piece of data. The node then stores the re-encrypted piece of data in encrypted data storage 135. In some embodiments, the execution of a subtask can be performed based on conditions specified in configuration data storage 130. A node can only execute subtasks when all the specified conditions are satisfied. For example, one such condition is a range of time (e.g., 9 PM to 12 AM, 11 PM to 5AM, etc.) condition. Based on this condition, a node will execute the subtask only when the time is within the range of time. Other examples can include days of the week, months during the year, free resource levels of the node (e.g., less than 25% CPU utilization, 2 GB of free memory, etc.), etc.

Figure 2:
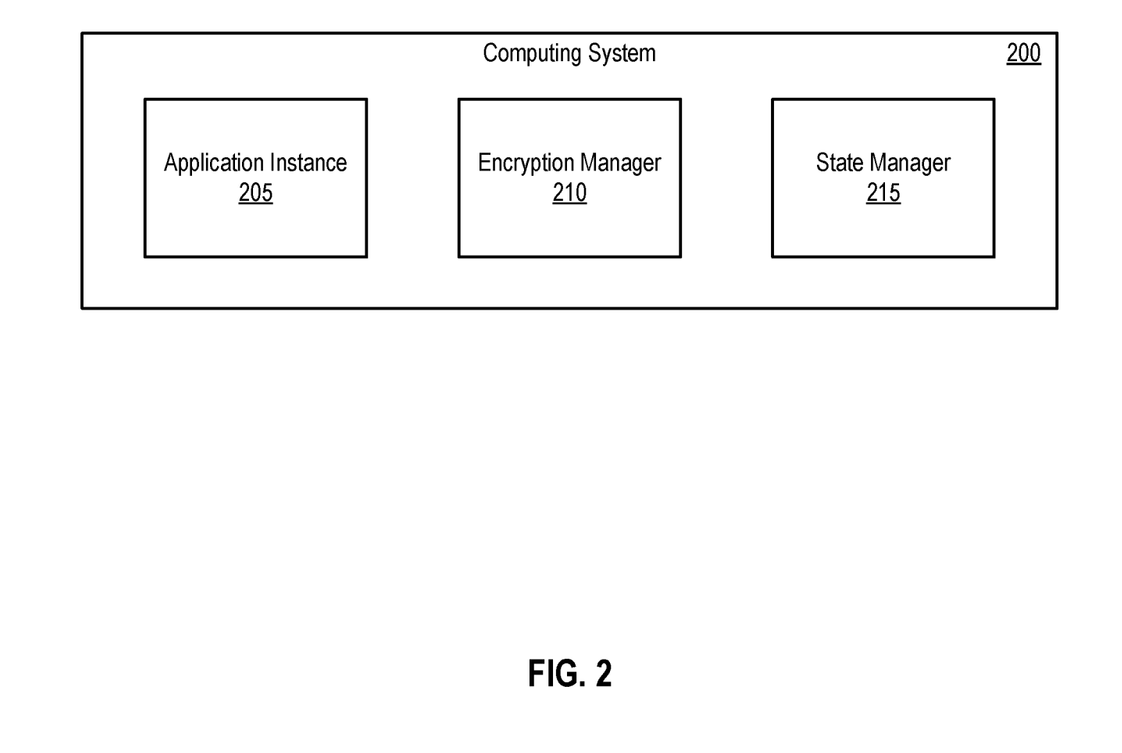
FIG. 2 illustrates a computing system according to some embodiments.

FIG. 2 illustrates a computing system 200 according to some embodiments. In some embodiments, computing system 200 is used to implement each of the nodes 110-125. As illustrated, computing system 200 includes application instance 205, encryption manager 210, and state manager 215. Application instance 205 is an instance of a software application (e.g., application 105) that is implemented by a computer cluster that includes computing system 200. As such, application instance 205 uses data associated with the application that is stored (e.g., in a storage like encrypted data storage 135) in an encrypted format.

Encryption manager 210 is configured to manage re-encryption of data. For example, encryption manager 210 can receive from a lead node (e.g., lead node 110) a subtask of a re-encryption task. As mentioned above, subtasks are batches of work for completing a re-encryption task. In response to receiving the subtask, encryption manager 210 may access a storage that stores configuration data (e.g., configuration data storage 130) to retrieve a set of conditions for performing re-encryption. Upon determining that the set of conditions are satisfied, encryption manager 210 access a storage storing encrypted data (e.g., encrypted data storage 135) to retrieve the set of data specified in the subtask. Then, encryption manager 210 starts re-encrypting each piece of data in the set of data by using the current encryption key to decrypt the piece of data, using the new encryption key to encrypt the decrypted piece of data, and storing the re-encrypted piece of data in the storage that stores encrypted data. In some embodiments, encryption manager 210 retrieves the current encryption key and the new encryption key from a storage configured to storage encryption keys. After encryption manager 210 finishes re-encrypting a piece of data, encryption manager 210 sends state manager 215 a message indicating so.

State manager 215 is responsible for managing the state of re-encryption tasks. For instance, state manager 215 may receive from encryption manager 210 a message indicating that a piece of data has been re-encrypted. In response to receiving such a message, state manager 215 accesses a storage configured to store state data (e.g., state data storage 140) and stores information indicating that the piece of data has been re-encrypted.

Figure 3:
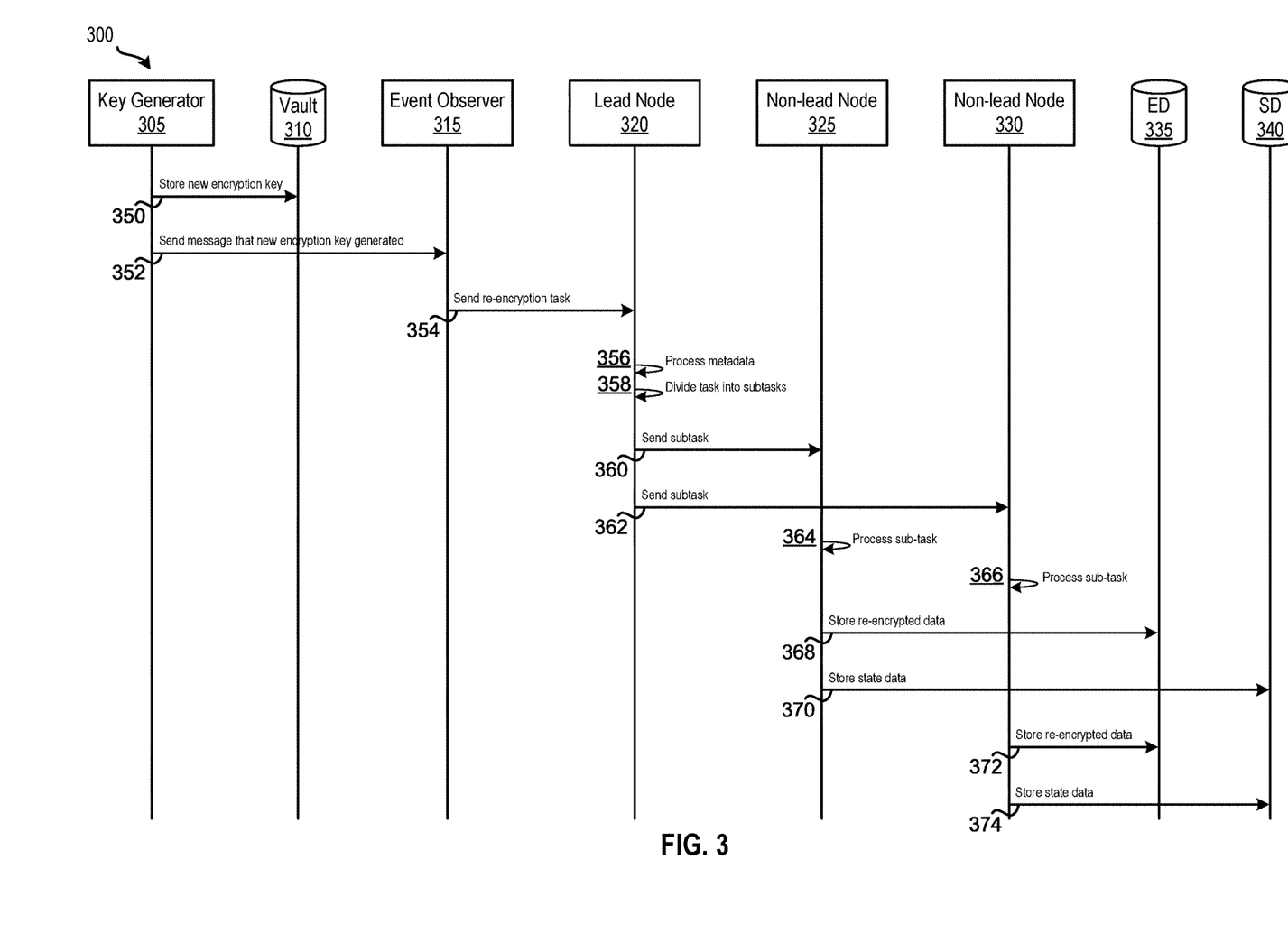
FIG. 3 illustrates an example data flow for re-encrypting data according to some embodiments.

FIG. 3 illustrates an example data flow 300 for re-encrypting data according to some embodiments. As shown, data flow 300 includes key generator 305, vault storage 310, event observer 315, lead node 320, non-lead node 325, non-lead node 330, encrypted data (ED) storage 335, and state data (SD) storage 340. Lead node 320 may be implemented by lead node 110. Non-lead nodes 325 and 330 can be implemented by one of the non-lead nodes 115-125. ED storage 335 may be implemented by encrypted data storage 135 and SD storage 340 may be implemented by state data storage 140. In some embodiments, key generator 305 and/or event observer 315 operates on the computing device used to implement one of the nodes 320-330. In other embodiments, key generator 305 and/or event observer 315 operates on a computing device(s) separate from the ones used to implement nodes 320-330.

In some embodiments, data flow 300 is performed in response to detecting the occurrence of a defined event (e.g., a security breach). In some embodiments, a security application is configured to detect such events. In some such embodiments, the security application operates on a computing device separate from the ones use to implement nodes 320-330. In other such embodiments, the security application operates on the computing device used to implement one of the nodes 320-330.

As shown, data flow 300 starts by key generator 305 generating a new encryption key in response to receiving a message that a defined event has occurred. Key generator 305 then stores, at 350, the new encryption key in vault storage 310. Next, key generator 305 sends, at 352, a message that the new encryption key has been generated to event observer 315. In response to receiving the message, event observer 315 generates a re-encryption task and sends, at 354, it to lead node 320. For this example, the re-encryption task specifies to re-encrypt data associated with the application implemented by nodes 320-330.

Once lead node 320 receives the re-encryption task, lead node 320 determines an amount of work to complete the task by accessing metadata stored in a configuration data storage (e.g., configuration data storage 130) that specifies which data in an encrypted data storage (e.g., encrypted data storage 135), which is used to store data associated with the application, is stored in an encrypted format. Based on the metadata, at 356, lead node 320 determines an amount of data that is to be re-encrypted and divides, at 358, the re-encryption task into subtasks based on the amount of data that is to be re-encrypted.

After dividing the re-encryption task into subtasks, lead node 320 assigns each of the subtasks to one of the nodes 320-330. Then, lead node 320 sends each subtask to the node to which the subtask is assigned. As illustrated in FIG. 3, lead node 320 sends, at 360, a subtask to non-lead node 325 and sends, at 362, a subtask to non-lead node 330. Upon receiving the subtasks, non-lead node 325 and non-lead nod 330 processes, at 364 and 366, their respective subtasks. Specifically, non-lead node 325 accesses ED storage to retrieve the set of data specified in the subtask. Then, non-lead node 325 re-encrypts each piece of data in the set of data by using the current encryption key to decrypt the piece of data, using the new encryption key to encrypt the decrypted piece of data, and storing, at 368, the re-encrypted piece of data in ED storage 335. Here, non-lead node 325 retrieves the current encryption key and the new encryption key from vault storage 310. In some embodiments, non-lead node 325 can receive the new encryption key from event observer 315. After re-encrypting a piece of data, non-lead node 325 accesses SD storage 340 and stores, at 370, information indicating that the piece of data has been re-encrypted. Non-lead node 330 performs similar operations to execute its subtask. In particular, non-lead node 330 accesses ED storage to retrieve the set of data specified in the subtask. Next, non-lead node 330 re-encrypts each piece of data in the set of data by using the current encryption key to decrypt the piece of data, using the new encryption key to encrypt the decrypted piece of data, and storing, at 372, the re-encrypted piece of data in ED storage 335. For this example, non-lead node 330 retrieves the current encryption key and the new encryption key from vault storage 310. In some embodiments, non-lead node 333 may receive the new encryption key from event observer 315. Once non-lead node 330 is done re-encrypting a piece of data, non-lead node 330 accesses SD storage 340 and stores, at 374, information indicating that the piece of data has been re-encrypted.

FIGS. 1-3 illustrate examples and embodiments where an application is implemented by several nodes. In some embodiments, a software service (e.g., a service, a microservice, etc.), instead of an application, is implemented by the nodes. In some such embodiments, each node includes an instance of the software service that uses data stored in an encrypted format. Moreover, FIGS. 1-3 show an application that is implemented by a particular number of nodes. One of ordinary skill in the art will understand that an application may be implemented by any number of nodes.

Figure 4:
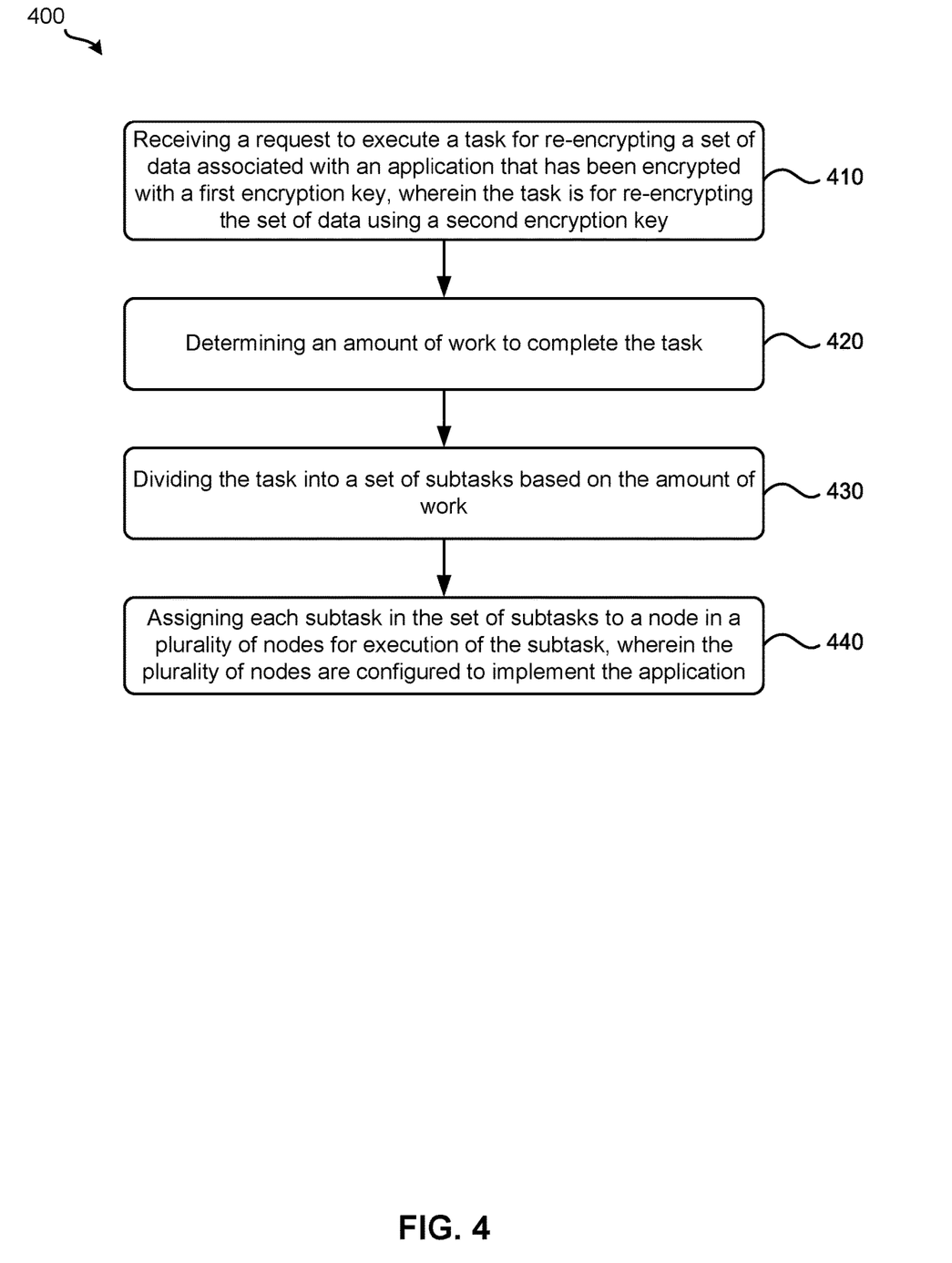
FIG. 4 illustrates a process for re-encrypting data according to some embodiments.

FIG. 4 illustrates a process 400 for re-encrypting data according to some embodiments. In some embodiments, a lead node (e.g., lead node 110) performs process 400. Process 400 begins by receiving, at 410 a request to execute a task for re-encrypting a set of data associated with an application that has been encrypted with a first encryption key, wherein the task is for re-encrypting the set of data using a second encryption key. Referring to FIG. 3 as an example, lead node 320 may receive the request from event observer 315. In some instances, lead node 320 can retrieve the second encryption key from vault storage 310. In other instances, lead node 320 may receive the second encryption key from event observer 315.

Next, process 400 determines, at 420, an amount of work to complete the task. Referring to FIG. 3 as an example, lead node 320 determines the amount of work by accessing metadata stored in a configuration data storage that specifies which data in an encrypted data storage is stored in an encrypted format. Based on the metadata, lead node 320 determines an amount of data that is to be re-encrypted. Process 400 then divides, at 430, the task into a set of subtasks based on the amount of work. Referring to FIG. 3 as an example, lead node 320 divides the re-encryption task into subtasks based on the amount of data that is to be re-encrypted.

Finally, process 400 assigns, at 440, each subtask in the set of subtasks to a node in a plurality of nodes for execution of the subtask, wherein the plurality of nodes are configured to implement the application. Referring to FIG. 3 as an example, lead node 320 assigns each of the subtasks to nodes 320-330.

Figure 5:
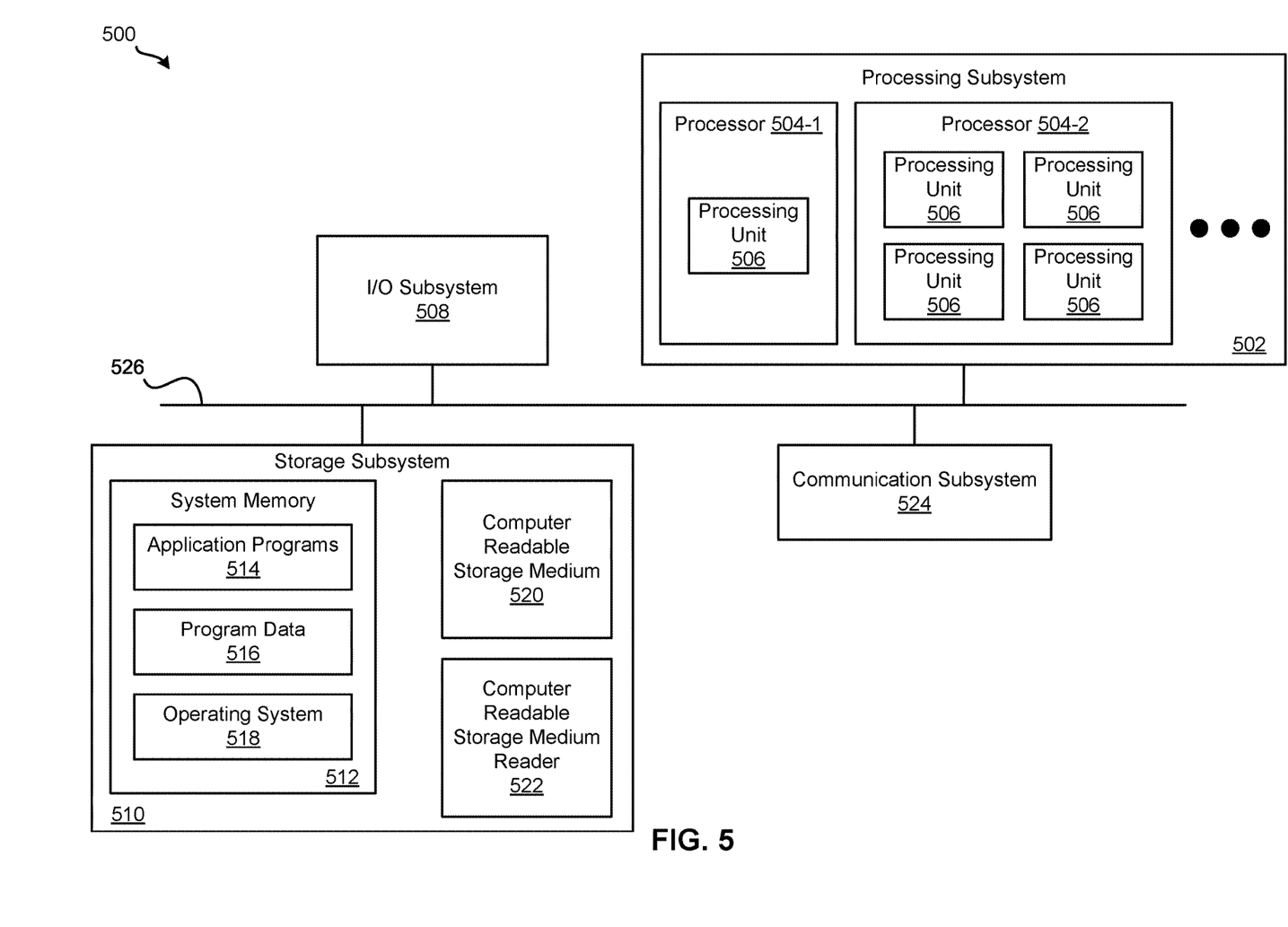
FIG. 5 illustrates an exemplary computer system, in which various embodiments may be implemented.

FIG. 5 illustrates an exemplary computer system 500 for implementing various embodiments described above. For example, computer system 500 may be used to implement each of the nodes 110-125, computing system 200, and each of the nodes 320-330. Computer system 500 may be a desktop computer, a laptop, a server computer, or any other type of computer system or combination thereof. Some or all elements of application instance 205, encryption manager 210, state manager 215, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 115), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., application instance 205, encryption manager 210, and state manager 215) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
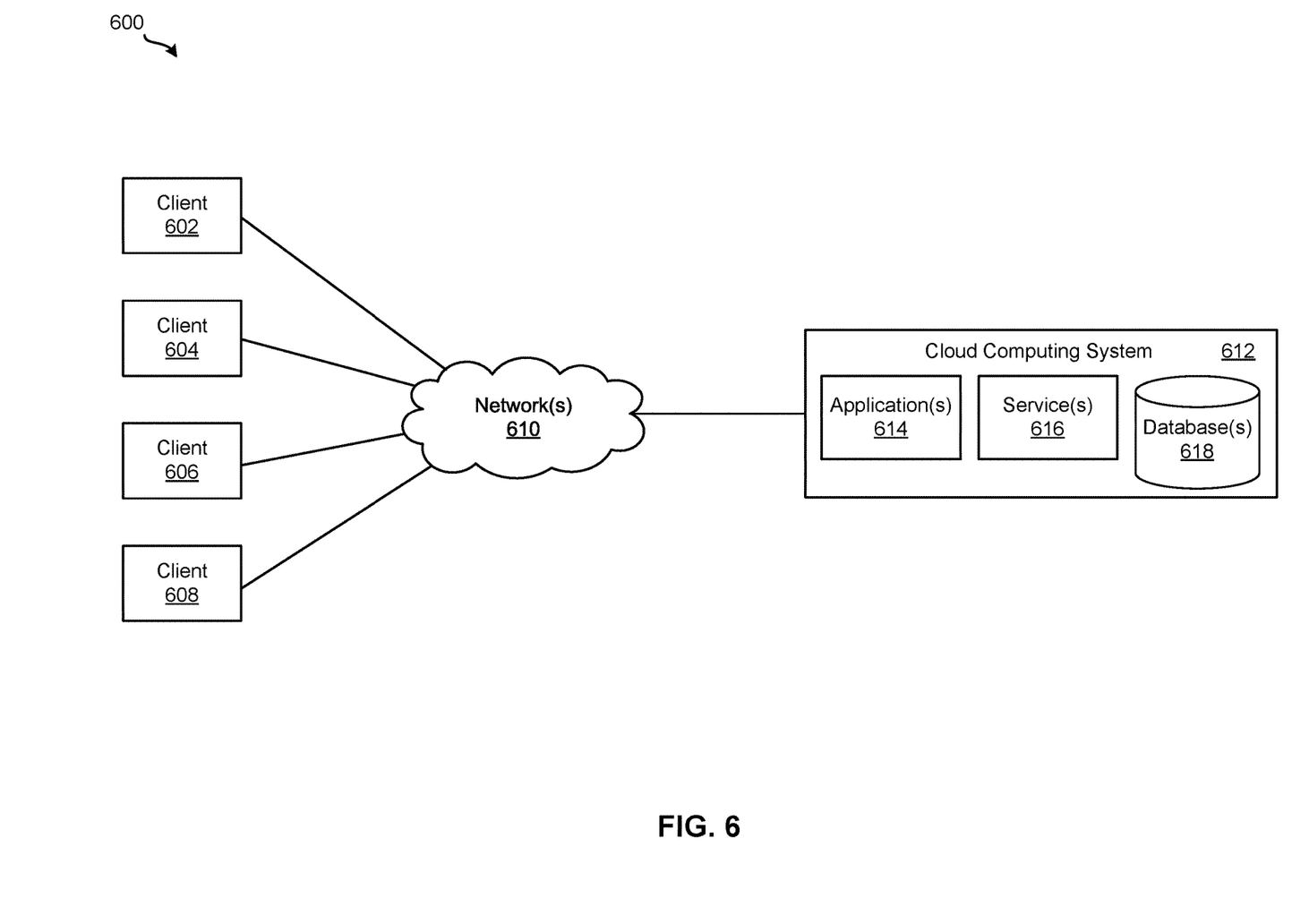
FIG. 6 illustrates an exemplary system, in which various embodiments may be implemented.

FIG. 6 illustrates an exemplary system 600 for implementing various embodiments described above. For example, application 614 may be used to implement application 105. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 612 is referred to as a "cloud service." Typically, servers and systems that make up cloud computing system 612 are different from the on-premises servers and systems of a customer. For example, cloud computing system 612 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. For instance, storages 130-140 may be stored in databases 618. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 618 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 500, as described above by reference to FIG. 5. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving a request to execute a task for re-encrypting a set of data associated with an application that has been encrypted with a first encryption key, wherein the task is for re-encrypting the set of data using a second encryption key;
determining an amount of work to complete the task, wherein the amount of work comprises an amount of data that is to be re-encrypted using the second encryption key;
dividing the task into a set of subtasks based on the amount of data that is to be re-encrypted; and
assigning each subtask in the set of subtasks to a node in a plurality of nodes for execution of the subtask, wherein the plurality of nodes are configured to implement the application.

2. The non-transitory machine-readable medium of claim 1, wherein the device is a particular node in the plurality of nodes, wherein the program further comprises a set of instructions for executing the subtask assigned to the particular node.

3. The non-transitory machine-readable medium of claim 2, wherein the subtask specifies a subset of the set of data, wherein executing the subtask comprises:
retrieving the subset of the set of data from a storage configured to store encrypted data;
using the first encryption key to decrypt the subset of the set of data;
using the second encryption key to encrypt the subset of the set of data, and
storing the encrypted subset of the set of data in the storage.

4. The non-transitory machine-readable medium of claim 1, wherein the program further comprises a set of instructions for retrieving configuration data associated with the application, the configuration data comprising metadata specifying data in the set of data that is encrypted, wherein determining the amount of work is based on the metadata.

5. The non-transitory machine-readable medium of claim 1, wherein dividing the task into the set of subtasks comprises dividing the task into a set of batches of work.

6. The non-transitory machine-readable medium of claim 5, wherein the set of data is stored in a database, wherein each batch of work in the set of batches of work specifies a set of rows in the database storing a subset of the set of data.

7. The non-transitory machine-readable medium of claim 5, wherein the set of data is stored in a file system comprising a plurality of files, wherein each batch of work in the set of batches of work specifies a set of files in the plurality of files storing a subset of the set of data.

8. A method executable by a device, the method comprising:
receiving a request to execute a task for re-encrypting a set of data associated with an application that has been encrypted with a first encryption key, wherein the task is for re-encrypting the set of data using a second encryption key;
determining an amount of work to complete the task, wherein the amount of work comprises an amount of data that is to be re-encrypted using the second encryption key;
dividing the task into a set of subtasks based on the amount of data that is to be re-encrypted; and
assigning each subtask in the set of subtasks to a node in a plurality of nodes for execution of the subtask, wherein the plurality of nodes are configured to implement the application.

9. The method of claim 8, wherein the device is a particular node in the plurality of nodes, the method further comprising executing the subtask assigned to the particular node.

10. The method of claim 9, wherein the subtask specifies a subset of the set of data, wherein executing the subtask comprises:
retrieving the subset of the set of data from a storage configured to store encrypted data;
using the first encryption key to decrypt the subset of the set of data;
using the second encryption key to encrypt the subset of the set of data, and
storing the encrypted subset of the set of data in the storage.

11. The method of claim 8 further comprising retrieving configuration data associated with the application, the configuration data comprising metadata specifying data in the set of data that is encrypted, wherein determining the amount of work is based on the metadata.

12. The method of claim 8, wherein dividing the task into the set of subtasks comprises dividing the task into a set of batches of work.

13. The method of claim 12, wherein the set of data is stored in a database, wherein each batch of work in the set of batches of work specifies a set of rows in the database storing a subset of the set of data.

14. The method of claim 12, wherein the set of data is stored in a file system comprising a plurality of files, wherein each batch of work in the set of batches of work specifies a set of files in the plurality of files storing a subset of the set of data.

15. A system comprising:
a set of processing units; and
a non-transitory machine-readable medium storing instructions that when executed by at least one processing unit in the set of processing units cause the at least one processing unit to:
receive a request to execute a task for re-encrypting a set of data associated with an application that has been encrypted with a first encryption key, wherein the task is for re-encrypting the set of data using a second encryption key;
determine an amount of work to complete the task, wherein the amount of work comprises an amount of data that is to be re-encrypted using the second encryption key;
divide the task into a set of subtasks based on the amount of data that is to be re-encrypted; and
assign each subtask in the set of subtasks to a node in a plurality of nodes for execution of the subtask, wherein the plurality of nodes are configured to implement the application.

16. The system of claim 15, wherein the system is a particular node in the plurality of nodes, wherein the instructions further cause the at least one processing unit to execute the subtask assigned to the particular node.

17. The system of claim 16, wherein the subtask specifies a subset of the set of data, wherein executing the subtask comprises:
retrieving the subset of the set of data from a storage configured to store encrypted data;
using the first encryption key to decrypt the subset of the set of data;
using the second encryption key to encrypt the subset of the set of data, and
storing the encrypted subset of the set of data in the storage.

18. The system of claim 15, wherein the instructions further cause the at least one processing unit to retrieve configuration data associated with the application, the configuration data comprising metadata specifying data in the set of data that is encrypted, wherein determining the amount of work is based on the metadata.

19. The system of claim 15, wherein dividing the task into the set of subtasks comprises dividing the task into a set of batches of work.

20. The system of claim 19, wherein the set of data is stored in a database, wherein each batch of work in the set of batches of work specifies a set of rows in the database storing a subset of the set of data.

* * * * *